(12) United States Patent
Connolly et al.

(10) Patent No.: US 9,148,382 B2
(45) Date of Patent: Sep. 29, 2015

(54) ADAPTIVE ETHERNET FLOW CONTROL SYSTEMS AND METHODS

(75) Inventors: Matthew W. Connolly, Canton, GA (US); John K. Oltman, Chamblee, GA (US); Steven A. Surek, Leonardo, NJ (US)

(73) Assignee: Ciena Corporation, Hanover, MD (US)

( * ) Notice: Subject to any disclaimer, the term of this patent is extended or adjusted under 35 U.S.C. 154(b) by 565 days.

(21) Appl. No.: 13/397,552

(22) Filed: Feb. 15, 2012

(65) Prior Publication Data

US 2013/0208595 A1 Aug. 15, 2013

(51) Int. Cl.
*H04L 12/825* (2013.01)
*H04L 12/835* (2013.01)
*H04L 12/931* (2013.01)
*H04L 12/841* (2013.01)

(52) U.S. Cl.
CPC .............. *H04L 47/266* (2013.01); *H04L 47/30* (2013.01); *H04L 47/283* (2013.01); *H04L 49/351* (2013.01)

(58) Field of Classification Search
None
See application file for complete search history.

(56) References Cited

U.S. PATENT DOCUMENTS

| | | | | |
|---|---|---|---|---|
| 5,400,329 | A * | 3/1995 | Tokura et al. | 370/232 |
| 6,061,357 | A * | 5/2000 | Olshansky et al. | 370/401 |
| 6,754,179 | B1 | 6/2004 | Lin | |
| 6,980,520 | B1 | 12/2005 | Erimli | |
| 6,996,125 | B2 * | 2/2006 | Kfir et al. | 370/466 |
| 7,286,469 | B2 | 10/2007 | Kauschke et al. | |
| 7,417,950 | B2 | 8/2008 | Hofmeister et al. | |
| 7,436,773 | B2 | 10/2008 | Cunningham | |
| 7,593,327 | B2 | 9/2009 | Bordogna et al. | |
| 7,684,419 | B2 | 3/2010 | Loprieno | |
| 7,961,606 | B2 | 6/2011 | Cunningham | |
| 2002/0087723 | A1 | 7/2002 | Williams et al. | |
| 2002/0172205 | A1 * | 11/2002 | Tagore-Brage et al. | 370/395.42 |
| 2003/0218981 | A1 * | 11/2003 | Scholten | 370/235 |
| 2004/0022187 | A1 * | 2/2004 | She et al. | 370/229 |
| 2004/0156390 | A1 | 8/2004 | Prasad et al. | |
| 2005/0182848 | A1 | 8/2005 | McNeil, Jr. et al. | |
| 2006/0045009 | A1 | 3/2006 | Madison et al. | |
| 2008/0165888 | A1 * | 7/2008 | Wiggins et al. | 375/295 |

(Continued)

OTHER PUBLICATIONS

Siamack Ayandeh and Khaled Amer; IEEE 802.3 Flow Control Baseline Requirement; IEE 802.3 CMSG Jul. 12, 2004.

(Continued)

*Primary Examiner* — Robert C Scheibel
*Assistant Examiner* — Saba Tsegaye
(74) *Attorney, Agent, or Firm* — Clements Bernard PLLC; Christopher L. Bernard; Lawrence A. Baratta, Jr.

(57) ABSTRACT

A network element implemented method includes receiving an Ethernet connection at a first rate, transmitting the Ethernet connection at a second rate, monitoring a buffer fill associated with the Ethernet connection, and periodically transmitting pause frames to a device associated with the Ethernet connection, wherein the pause frames include a determined optimal pause quanta value based on the first rate, the second rate, and the buffer fill. A network element includes a first port receiving an Ethernet connection at a first rate, a second port transmitting the Ethernet connection at a second rate, and monitor circuitry configured to monitor a buffer fill associated with the Ethernet connection and cause the first port to periodically transmit pause frames, wherein the pause frames include a determined optimal pause quanta value based on the first rate, the second rate, and the buffer fill.

14 Claims, 6 Drawing Sheets

(56) References Cited

U.S. PATENT DOCUMENTS

2008/0291832 A1 11/2008 Bordogna et al.
2009/0323727 A1 12/2009 Surek
2010/0150163 A1  6/2010 Ahn et al.
2011/0211827 A1  9/2011 Soto et al.
2013/0051235 A1* 2/2013 Song et al. .................... 370/235

OTHER PUBLICATIONS

Bill Bunch; Asymmetric Flow Control (AFC) and Gigabit Ethernet Task Force; National Semiconductor Corp.—IEEE 802.3z; Nov. 5, 1996, Rev. 1.0.

* cited by examiner

ADAPTIVE ETHERNET FLOW CONTROL SYSTEMS AND METHODS

FIELD OF THE INVENTION

Generally, the field of art of the present disclosure pertains to communication networks, and more particularly, to adaptive quantized Ethernet pause flow control systems and methods.

BACKGROUND OF THE INVENTION

For network operators and end users, Ethernet is becoming ubiquitous. From a network operation view, Ethernet is typically provided as a Layer 2 protocol transported over Layer 0/1 (e.g., Synchronous Optical Network (SONET), Synchronous Digital Hierarchy (SDH), Optical Transport Network (OTN), Generic Framing Protocol (GFP), Wavelength Division Multiplexing (WDM), etc.). As such, a rate mismatch can occur between the Ethernet and the underlying transport mechanism. In accordance with IEEE 802.3x and variants thereof, an overwhelmed network element (NE) can send a PAUSE frame, which halts the transmission by the sender for a specified period of time. Media Access Control (MAC) frames are used to carry the PAUSE commands between NEs. A PAUSE frame includes a period of pause time being requested, in the form of two byte unsigned integer (0 through 65535). This number is the requested duration of the PAUSE. The pause time is measured in units of pause "quanta," where each unit is equal to 512 bit times. The receiver will honor the most recent PAUSE request it receives and hold off transmission for duration of the pause. Conventionally, there are two implementations for flow control, namely XON/XOFF and periodic quanta.

For XON/XOFF, when a network element's ingress buffer fills to a certain water-mark, a PAUSE frame is sent with a very large pause quanta, with the intent to shut of the far end transmission of frames. When the fill level of the buffer drops below a water-mark, a PAUSE frame is sent with a zero quanta value, with the intent to turn the far end transmitter back on. The goal here is to avoid buffer over-flow and under-run. However, XON/XOFF is severely limited by link distance and the resulting delay for the PAUSE command. Also, this limitation gets worse when the server layer rate is much smaller than the packet data rate. For long link distances and relatively small container sizes, it can be shown large amounts of buffer is required. In addition to limiting link distance, XON/XOFF causes an increase in latency variation (jitter). For example, a gigabit Ethernet (GbE) with GFP-Frame (GFP-F) mapping into an Synchronous Transport Signal-3 concatenated (STS-3c) container and a 54 kB exemplary buffer only has a maximum link distance of about 10 km with a latency variation of 2.88 ms. For periodic quanta, a network element is constantly sending PAUSE frames to its link partner at a predetermined constant quanta and frequency. The quanta and frequency values are chosen in such a way as to insure that the buffer never overflows, but is still provides sufficient throughput. Unlike the XON/XOFF, the periodic quanta works around the link distance limitation, and does not have the issue with latency variation. However, periodic quanta is inefficient, especially for small frames when doing GFP-F mapping of Ethernet.

BRIEF SUMMARY OF THE INVENTION

In an exemplary embodiment, a network element method includes receiving an Ethernet connection at a first rate, transmitting the Ethernet connection at a second rate, monitoring a buffer fill associated with the Ethernet connection, and periodically transmitting pause frames to a device associated with the Ethernet connection, wherein the pause frames include a determined optimal pause quanta value based on the first rate, the second rate, and the buffer fill. The method can further include, prior to transmitting the Ethernet connection at the second rate, mapping the Ethernet connection using Generic Framing Protocol. The method can further include mapping the Generic Framing Protocol mapped Ethernet connection into a container. The first rate can be associated with a rate of the Ethernet connection, and the second rate can be associated with a container rate in which the network element transmits the Ethernet connection. The method can further include, prior to the monitoring, determining the determined optimal pause quanta value based on the first rate, the second rate, and the buffer fill; monitoring the buffer fill to determine the buffer fill relative to a watermark; and periodically transmitting pause frames with the determined optimal pause quanta value based on the buffer fill relative to the watermark.

The method can further include determining the determined optimal pause quanta value while accounting for a packing efficiency based on Generic Framing Protocol mapping. The method can further include determining the watermark based on a round trip delay on the receiving. The round trip delay can be determined based on a physical module performing the receiving. The periodically transmitting pause frames can include, if buffer fill is in a first region, periodically transmitting pause frames with the determined optimal pause quanta value including a first value, $Q(g)$, and, if buffer fill is in a second region, periodically transmitting pause frames with the determined optimal pause quanta value including a second value, $Q(r)$. The first value, $Q(g)$, can be determined based on a small frame size for the Ethernet connection and the second value, $Q(r)$, can be determined based on a large frame size for the Ethernet connection. The small frame size can be 64 bytes and the large frame size can be 9600 bytes.

In another exemplary embodiment, a network element includes a first port receiving an Ethernet connection at a first rate, a second port transmitting the Ethernet connection at a second rate, and monitor circuitry configured to monitor a buffer fill associated with the Ethernet connection and cause the first port to periodically transmit pause frames, wherein the pause frames include a determined optimal pause quanta value based on the first rate, the second rate, and the buffer fill. The network element can further include mapping circuitry configured to map the Ethernet connection using Generic Framing Protocol into a container. The first rate can be associated with a rate of the Ethernet connection, and the second rate can be associated with a container rate in which the second port transmits the Ethernet connection. The determined optimal pause quanta value can be determined based on the first rate, the second rate, and the buffer fill; and the monitor circuitry can be configured to monitor the buffer fill to determine the buffer fill relative to a watermark, and cause the first port to periodically transmit pause frames with the determined optimal pause quanta value based on the buffer fill relative to the watermark.

The determined optimal pause quanta value can be determined while accounting for a packing efficiency based on Generic Framing Protocol mapping. The watermark can be determined based on a round trip delay between the first port and the second port. The monitor circuitry can be configured to, if buffer fill is in a first region, cause the first port to periodically transmit pause frames with the determined optimal pause quanta value including a first value, $Q(g)$, and, if buffer fill is in a second region, cause the first port to periodically transmit pause frames with the determined optimal pause quanta value including a second value, $Q(r)$. The first value, $Q(g)$, can be determined based on a small frame size for the Ethernet connection and the second value, Q(r), can be determined based on a large frame size for the Ethernet connection.

In yet another exemplary embodiment, a network includes a first network element, a second network element, an Ethernet connection between the first network element and the second network element, a container between the first network element and the network, wherein the container includes the Ethernet connection, and a flow control system between the first network element and the second network element, wherein the flow control system causes pause frames to be periodically transmitted from the first network element to the second network element with a determined optimal pause quanta, and wherein the determined optimal pause quanta is based on a rate of the Ethernet connection, a rate of the container, packing efficiency of the container, round trip delay between the first network element and the second network element, and monitored buffer fill at the first network element.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to adaptive quantized Ethernet pause flow control systems and methods. That is, the systems and methods described herein provide an adaptive periodic quantized pause where the quanta depends on container rate and buffer depth. The systems and methods dynamically adjust the pause quanta based on buffer fill level; solving three major problems with previous implementations including link distance limitations with XON/XOFF, latency variation with XON/XOFF, and small packet throughput penalty with the periodic quanta method. Generally, the Ethernet flow control systems and methods utilize periodic PAUSE frames with quanta values selected based on buffer fill level. In an exemplary embodiment, the Ethernet flow control systems and methods can use a first quanta value optimized for small frame sizes (e.g., 64 bytes) and a second quanta value optimized for large frame sizes (e.g., 9600 bytes). The first quanta value can be used until the buffer fill level hits a certain watermark after which the second quanta value can be used. This watermark can be based on a round trip time to prevent buffer overrun.

Figure 1:
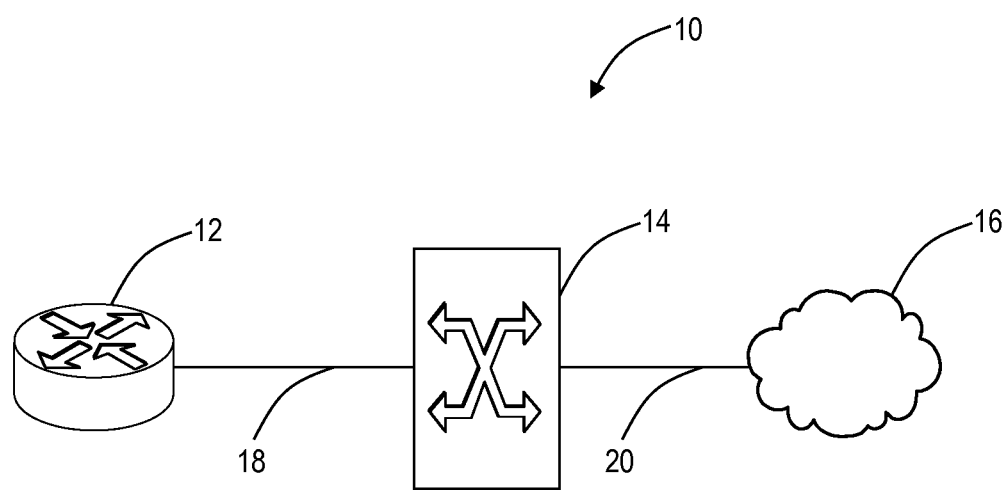
FIG. 1 is a network diagram of an exemplary network for transport of Ethernet.

Referring to FIG. 1, in an exemplary embodiment, a diagram illustrates an exemplary network 10 for transport of Ethernet. In particular, a first network element 12 is communicatively coupled to a second network element 14 which is communicatively coupled to a network 16. The network element 12 provides an Ethernet connection 18 to the network element 14, and the network element 14 communicates the Ethernet connection 18 as part of a layer 0/1 connection 20 to the network 16. The Ethernet flow control systems and methods described herein relate to adaptively controlled the flow on the connection 18 between the network element 14 and the network element 12. For example, the Ethernet flow control systems and methods can be implemented by the network element 14 to control the flow of the connection 18 from the network element 12. The network elements 12, 14 can be any type of network element. In an exemplary embodiment, the network element 12 can be a client or end user device, such as a router, switch, server, etc. The network element 14 can be a Layer 0/1 device using SONET, SDH, OTN, WDM, etc. to transport Ethernet over the network 16. In another exemplary embodiment, the network elements 12, 14 can both be Ethernet switches (or switches embedded in another type of device).

In context of the Ethernet flow control systems and methods, the network element 14 has a need to utilize flow control with the network element 12 on the connection 18. This can arise for any number of reasons. For example, the connection 18 can be GbE with a rate of approximately 1 Gb/s and the connection 20 can be some other container type with a different rate, e.g. STS-1 (with a rate of approximately 51 Mb/s), STS-3c (with a rate of approximately 155 Mb/s), etc. In another example, the connection 18 can be 10 GbE with a rate of approximately 10 Gb/s and the connection 20 can be some other container type with a different rate, e.g. ODUflex, VC3-24v, VC4-8v (with a rate of approximately 1.24 Gb/s), ODU-flex, VC3-48v, VC4-16v, STM-16c, OC-48c (with a rate of approximately 2.5 Gb/s), etc. Also, the link distance of the connection 20 can be thousands of kilometers in long haul networks, and generally, the link distance can be unknown to the network element 14. The Ethernet flow control systems and methods provide a distance irrelevant and efficient container rate based scheme for flow control management of the connection 18. Further, an objective of the Ethernet flow control systems and methods can include limiting buffers (e.g., First-in-First-out, FIFO buffers) on the network element 14.

In an exemplary embodiment, the network element 14 can provide packet over SONET/SDH or OTN interfaces with STS-n, ODUk, or ODUflex server layer containers operating below the Ethernet link rate. Also, these applications can use ITU-T G.7041 "Generic Framing Protocol (GFP)" mapping procedures (or variants thereof) to map the connection 18 to the connection 20. Of note, GFP-F mapping removes an Ethernet preamble and inter-frame gap from each Ethernet frame on the connection 18, and replaces these with a GFP header and GFP frame check sequence (FCS). An interesting consequence of this mapping is a net reduction of 8 bytes per frame between the connection 18 and the connection 20. Specifically, the inter-frame gap includes 12 bytes and the preamble includes 8 bytes for a total of 20 bytes per frame on the connection 18. With the GFP-F mapping in the network element 14, the connection 20 has a reduction of 8 bytes per frame since the GFP header includes 8 bytes and the GFP FCS includes 4 bytes for a total of 12 bytes (versus 20 bytes on the connection 18, i.e. an 8 byte reduction).

As is well known, Ethernet frames (or packets, i.e. packet can be used interchangeably for frame herein) can have a variable length, such as between 64 bytes and 9600 bytes. On 64 byte frames, the aforementioned packing efficiency through GFP-F mapping is significant, i.e. a 64 byte frame gains about 10.5% efficiency due to the GFP-F 8 byte reduction. That is, an 8 byte reduction is significant in the context of smaller sized frames, e.g. 64 byte frames. Note, this efficiency increase assumes the presence of optional GFP FCS or CRC overhead, and if this optional overhead is not included, the efficiency goes up to 16.6%. Of course, on a 9600 byte frame, the packing efficiency is negligible (i.e., only about 0.1% efficiency assuming the presence of the GFP CRC overhead). Thus, if a constant stream of pause quanta is sent to support worse case large frames, the packing efficiency gain for small frames is lost. Throughput for certain traffic patterns it can be reduced by as much as 10.5%. Of note, small frames such as 64 bytes or equivalent can include real time traffic with low latency. In an exemplary embodiment, the Ethernet flow control systems and methods gain the advantages of quantized pause while maximizing throughput for small Ethernet frames.

Figure 2:
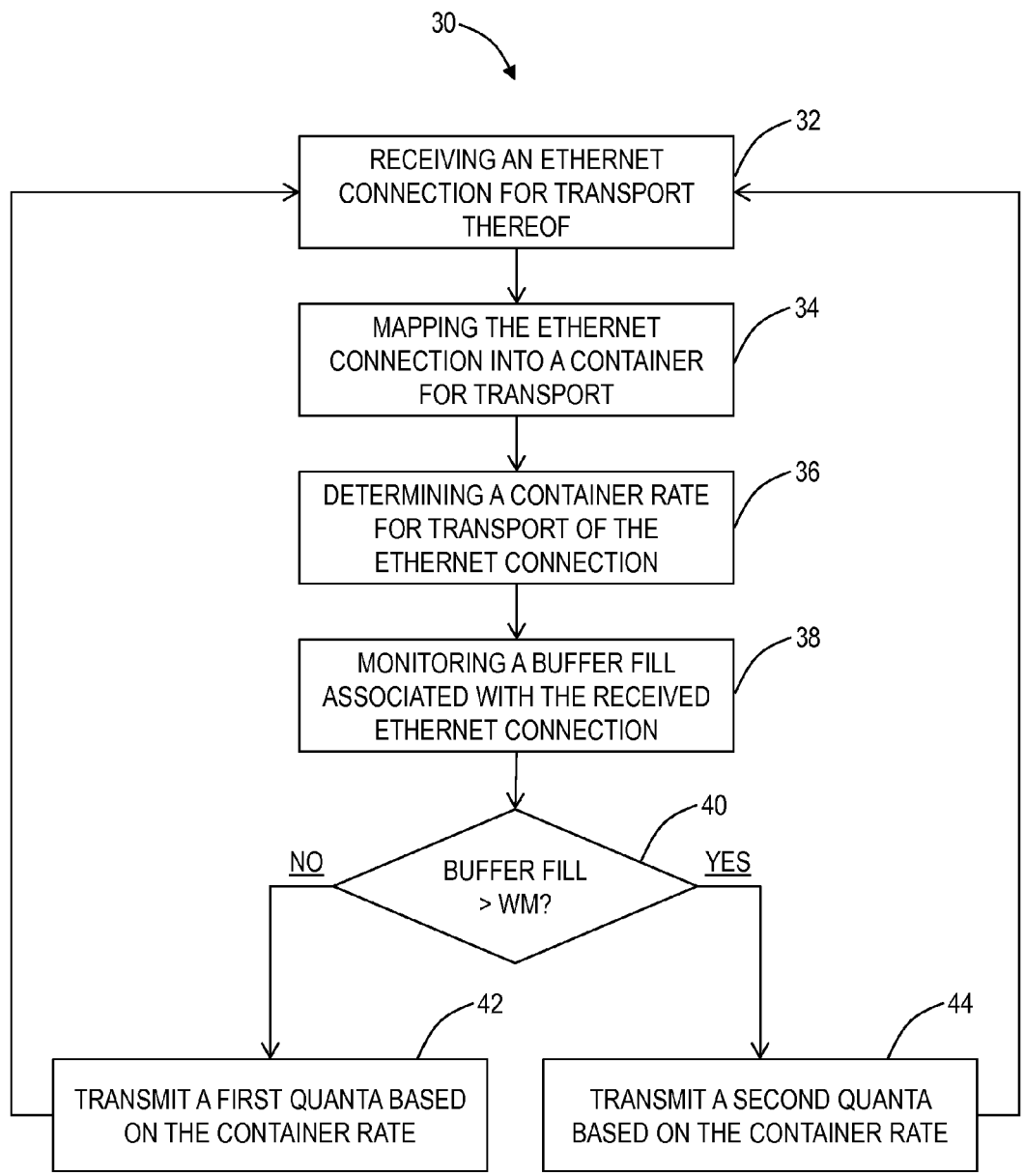
FIG. 2 is a flowchart of an Ethernet flow control method using an adaptive periodic quantized pause where the quanta depends on container rate and buffer fill level.

Referring to FIG. 2, in an exemplary embodiment, a flowchart illustrates an Ethernet flow control method 30 using an adaptive periodic quantized pause where the quanta depends on container rate and buffer fill level. The method 30 contemplates use with the network 10. For example, the method 30 can be implemented by the network element 14 for determining flow control to the network element 12 for the connection 18. Of course, the method 30 contemplates use with any network element in any type of network for providing adaptive Ethernet flow control. The method 30 includes receiving an Ethernet connection for transport thereof (step 32). The Ethernet connection can be a GbE, 10 GbE, 100 GbE, 40 GbE, Fast Ethernet, etc. That is, the Ethernet connection can be any type of Ethernet at any rate including new variants. The method 30 includes mapping the Ethernet connection into a container for transport (step 34). As described herein, generally, Ethernet is a Layer 2 protocol that is transported over other protocols at Layers 0/1. The container can include SONET, SDH, OTN, GFP, and combinations thereof. Further, the container can be anything that can be used to transport Ethernet therein. One aspect of the method 30 is that it can apply to any type of Ethernet and any type of container with the variables in the method 30 addressing the adaptive periodic quantized PAUSE being container rate relative to Ethernet rate and buffer fill level.

The method 30 also includes determining a container rate for transport of the Ethernet connection (step 36). Note, this determining step can be at any point in the method 30, and generally is used to determine the adaptive periodic quantized PAUSE. The method 30 includes monitoring a buffer fill level associated with the received Ethernet connection (step 38). If the buffer fill is less than (or equal to) a watermark (WM) (step 40), the method 30 transmits a first quanta in a PAUSE frame based on the container rate (step 42). If the buffer fill is greater than (or equal to) the watermark (WM) (step 40), the method 30 transmits a second quanta in a PAUSE frame based on the container rate (step 44). Specifically, based on observations and calculations, predetermined, optimal PAUSE quanta can be sent based on the container rate and the buffer fill. These PAUSE quanta can be predetermined and available to the method 30 for use based on a lookup function, e.g. container rate X, buffer fill Y yields a PAUSE quanta of Z. That is, the first quanta and the second quanta are already determined with the method 30 choosing such based on container rate, Ethernet rate, and buffer fill.

Figure 3:
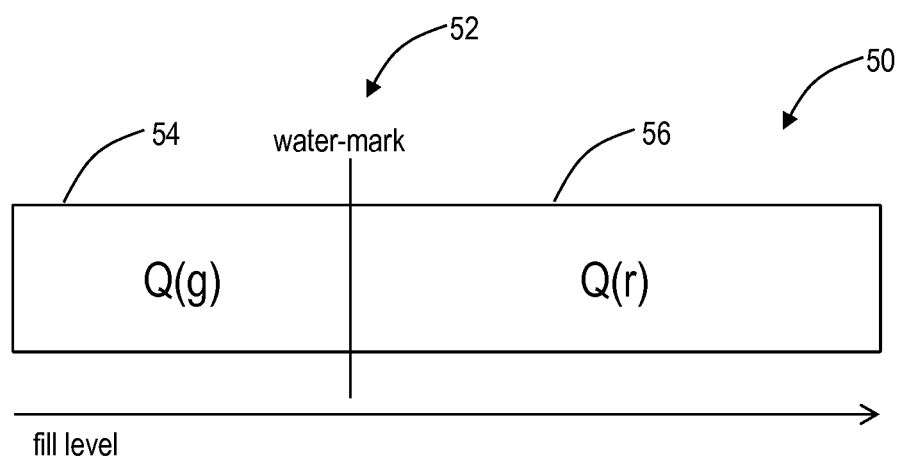
FIG. 3 is a diagram of a buffer, a watermark, and regions of the buffer for use in the Ethernet flow control method of FIG. 2.

Referring to FIG. 3, in an exemplary embodiment, a diagram illustrates a buffer 50, a watermark 52, and regions 54, 56 of the buffer 50 for use in the method 30. The buffer 50 includes electronic circuitry, logic, memory, etc. that is configured to store Ethernet frames. For example, the buffer 50 can reside in the network element 14 to buffer frames from the connection 18 if there is not room on the connection 20 for transmission. The buffer 50 can be measured in size in terms of memory, e.g. Kb, Mb, etc. In an exemplary embodiment, the method 30 is implemented with two levels, i.e. below or above the watermark 52. The watermark 52 is a threshold value of fill level of the buffer 50. In the method 30, the buffer 50 is divided into the two regions 54, 56 with the first quanta, denoted as Q(g), sent by a PAUSE frame when the fill level is in the first region 54, and with the second quanta, denoted as Q(r), sent by a PAUSE frame when the fill level is in the second region 56. Specifically, the region 54 represents a "green" region, i.e. Q(g), and the region 56 represents a "red" region, i.e. Q(r). That is, the first region 54 is green because of low or no buffer fill, and the second region 56 is red due to buffer fill above the watermark 52. In other words, the method 30 is sending an optimized quanta in a PAUSE frame based on a state of the buffer 50, and not a worst case amount which is inefficient. While the buffer 50 is illustrated in the two regions 54, 56, those of ordinary skill in the art will understand the method 30 can use any number of regions above two for finer adaptive granularity.

The quanta values, Q(g) and Q(r), are predetermined based on Ethernet rate, container payload rate, frame size, buffer fill, etc. For example, Q(g) and Q(r) values can be predetermined for transmitting a GbE into a VC3-Xv with X=1-21, a GbE into a VC4-Xv with X=1-7, a 10 GbE into a VC3-Xv with X=1-192, a 10 GbE into a VC4-Xv with X=1-64, a 10 GbE into an STM-64c (Synchronous Transport Module, level 64 concatenated), a 10 GbE into an ODUk.ts with ts=1-8, a 40 GbE into an ODUk.ts with ts=1-32, a 100 GbE into an ODUk.ts with ts=1-80, and the like. A VC3 is a Virtual Container, level 3, of approximately 51 Mb/s, and a VC4 is a Virtual Container, level 4, of approximately 155 Mb/s. A VC3-Xv denotes virtual concatenation of a container with a rate approximately equal to 51 Mb/s times X, and a VC4-Xv denotes virtual concatenation of a container with a rate approximately equal to 155 Mb/s times X. ODUk.ts refers to ODUflex where ts denotes tributary slots.

In describing how the predetermined quanta values, Q(g) and Q(r), are derived, assume a 10 GbE connection into an ODUflex (ODUk.ts, ts=1-8). Table 1 as follows illustrates constant values for the 10 GbE connection into ODUflex scenario.

TABLE 1

Constant values

| | Bytes | Bits | |
|---|---|---|---|
| ODUflex payload rates | | 1249052312 | ODU2.1 min |
| | | 1254344907 | ODU3.1 min |
| | | 1301336986 | ODU4.1 min |
| IPG | 12 | 96 | |
| Preamble | 8 | 64 | |
| GFP Header | 8 | 64 | |
| GFP CRC-32 (FCS) | 0 | 0 | |

In Table 1, the ODUflex payload rates represent worst case rates including appropriate clock tolerances. For example, ODU2.1 is computed equal to 0.9999*0.999814*9953280000*238/237/8, ODU3.1 is computed equal to 0.9999*0.999814*9953280000*238/236/8, and ODU4.1 is computed equal to 0.9999*0.999814*9953280000*238/227/8*3800/3808.

Table 2 below computes the maximum possible Ethernet data bandwidth (the Media Access Control (MAC) frame bandwidth) that can be transported in this case by an ODUflex container where the MAC frames are mapped using GFP-F mapping.

TABLE 2

ODUflex Max Possible Ethernet Frame Throughput (w/o Ethernet Preamble)

| ODUk.ts, ts = | 64 | 256 | 512 | 768 | 1024 | 1518 |
|---|---|---|---|---|---|---|
| 1 | 1.11E+09 | 1.2E+09 | 1.2E+09 | 1.2E+09 | 1.2E+09 | 1.2E+09 |
| 2 | 2.221E+09 | 2.4E+09 | 2.5E+09 | 2.5E+09 | 2.5E+09 | 2.5E+09 |
| 3 | 3.331E+09 | 3.6E+09 | 3.7E+09 | 3.7E+09 | 3.7E+09 | 3.7E+09 |
| 4 | 4.441E+09 | 4.8E+09 | 4.9E+09 | 4.9E+09 | 5E+09 | 5E+09 |
| 5 | 5.551E+09 | 6.1E+09 | 6.1E+09 | 6.2E+09 | 6.2E+09 | 6.2E+09 |
| 6 | 6.662E+09 | 7.3E+09 | 7.4E+09 | 7.4E+09 | 7.4E+09 | 7.5E+09 |
| 7 | 7.772E+09 | 8.5E+09 | 8.6E+09 | 8.7E+09 | 8.7E+09 | 8.7E+09 |
| 8 | 8.882E+09 | 9.7E+09 | 9.8E+09 | 9.9E+09 | 9.9E+09 | 9.9E+09 |

| ODUk.ts, ts = | 4000 | 6000 | 8000 | 9200 | 9600 |
|---|---|---|---|---|---|
| 1 | 1.247E+09 | 1.2E+09 | 1.2E+09 | 1.2E+09 | 1.2E+09 |
| 2 | 2.493E+09 | 2.5E+09 | 2.5E+09 | 2.5E+09 | 2.5E+09 |
| 3 | 3.74E+09 | 3.7E+09 | 3.7E+09 | 3.7E+09 | 3.7E+09 |
| 4 | 4.986E+09 | 5E+09 | 5E+09 | 5E+09 | 5E+09 |
| 5 | 6.233E+09 | 6.2E+09 | 6.2E+09 | 6.2E+09 | 6.2E+09 |
| 6 | 7.479E+09 | 7.5E+09 | 7.5E+09 | 7.5E+09 | 7.5E+09 |
| 7 | 8.726E+09 | 8.7E+09 | 8.7E+09 | 8.7E+09 | 8.7E+09 |
| 8 | 9.972E+09 | 1E+10 | 1E+10 | 1E+10 | 1E+10 |

From Table 2, note two things, namely that the ODUflex container can include 1 to 8 timeslots worth of ODU0 switching bandwidth, and that the bandwidth depends on the size of the Ethernet MAC frames (the size shown for 64, 256, 512, 768, . . . , 9600 byte MAC frames. The values in Table 2 represents the worst case available bandwidth for the transport container through which Ethernet data will be transported.

For example, with an ODUk.1 and 64 byte Ethernet MAC frames, the worst case available bandwidth is 1.11E+09 (actually=1,110,268,722). This is determined based on the following formula:

$$ts \cdot \text{rate} - ts \cdot \text{rate} \cdot \frac{\text{GFP\_Head\_Bits} + \text{GFP\_FCS\_Bits}}{\text{Frame\_Size} \cdot 8 + \text{GFP\_Head\_Bits} + \text{GFP\_FCS\_Bits}}$$

Here, is =1, i.e. ODUk.1, and the rate represents a worst case container rate. In our case, the ODU2.1 min rate of 1,249,052,312 from Table 1 is used. The Frame Size is equal to 64 (the multiplication by 8 is due to the calculation, i.e. the column header, and the GFP_Head_Bits and GFP_FCS_Bits are from Table 1 as well showing the reduction in bits per frame due to GFP-F mapping, i.e. the packing efficiency through GFP-F mapping described herein. Table 2 includes this calculation for various differing MAC frame sizes.

The following Table 3 provides maximum Ethernet Frame output rates.

TABLE 3

10GbE Max Possible Frame Output

| | 64 | 256 | 512 | 768 | 1024 | 1518 |
|---|---|---|---|---|---|---|
| 10GbE | 7.62E+09 | 9.3E+09 | 9.6E+09 | 9.7E+09 | 9.8E+09 | 9.9E+09 |

| | 4000 | 6000 | 8000 | 9200 | 9600 |
|---|---|---|---|---|---|
| 10GbE | 9.951E+09 | 1E+10 | 1E+10 | 1E+10 | 1E+10 |

The above calculation is similar to the calculation from Table 2, i.e. this maximum rate for the varying MAC frame sizes is adjusted based on the packing efficiency through GFP-F mapping described herein.

Referring to Tables 2 and 3, notice that in all but the case where the ODUflex is 8 timeslots (which turns out to have enough bandwidth to carry the entire 10 GbE), the 10 GbE bandwidth is greater than the ODUflex container bandwidth. This is where the PAUSE function is required. Periodically, PAUSE frames have to be sent to the client 10 GbE device to tell it to suspend sending data for a short period of time to allow the resulting actual 10 GbE packet bandwidth to drop to a level that can be carried by the ODUflex container. Without the PAUSE frames to limit the bandwidth, then the 10 GbE input signal would send data faster than the ODUflex could transport it and any input buffering would eventually be exhausted. The rate at which that input buffer would fill if PAUSE frame were not sent is what is represented in Table 4 and is simply the difference between the 10 GbE input bandwidth in Table 3 and the ODUflex transport bandwidth in Table 4 under worst case clock conditions.

TABLE 4

Fill Rate Without PAUSE frames

| ODUk.ts, ts = | 64 | 256 | 512 | 768 | 1024 | 1518 |
|---|---|---|---|---|---|---|
| 1 | 6.51E+09 | 8.07E+09 | 8.4E+09 | 8.51E+09 | 8.57E+09 | 8.63E+09 |
| 2 | 5.4E+09 | 6.85E+09 | 7.17E+09 | 7.27E+09 | 7.33E+09 | 7.39E+09 |
| 3 | 4.29E+09 | 5.64E+09 | 5.94E+09 | 6.04E+09 | 6.09E+09 | 6.14E+09 |
| 4 | 3.18E+09 | 4.43E+09 | 4.71E+09 | 4.8E+09 | 4.85E+09 | 4.9E+09 |
| 5 | 2.07E+09 | 3.22E+09 | 3.48E+09 | 3.57E+09 | 3.61E+09 | 3.66E+09 |
| 6 | 9.58E+08 | 2.01E+09 | 2.25E+09 | 2.33E+09 | 2.37E+09 | 2.42E+09 |
| 7 | 0 | 7.98E+08 | 1.02E+09 | 1.09E+09 | 1.13E+09 | 1.17E+09 |
| 8 | 0 | 0 | 0 | 0 | 0 | 0 |

| ODUk.ts, ts = | 4000 | 6000 | 8000 | 9200 | 9600 |
|---|---|---|---|---|---|
| 1 | 8.7E+09 | 8.72E+09 | 8.73E+09 | 8.73E+09 | 8.73E+09 |
| 2 | 7.46E+09 | 7.47E+09 | 7.48E+09 | 7.48E+09 | 7.48E+09 |
| 3 | 6.21E+09 | 6.23E+09 | 6.23E+09 | 6.24E+09 | 6.24E+09 |
| 4 | 4.97E+09 | 4.98E+09 | 4.98E+09 | 4.99E+09 | 4.99E+09 |
| 5 | 3.72E+09 | 3.73E+09 | 3.74E+09 | 3.74E+09 | 3.74E+09 |
| 6 | 2.47E+09 | 2.48E+09 | 2.49E+09 | 2.49E+09 | 2.49E+09 |
| 7 | 1.23E+09 | 1.24E+09 | 1.24E+09 | 1.24E+09 | 1.24E+09 |
| 8 | 0 | 0 | 0 | 0 | 0 |

From Table 4, it is shown that the difference in the rate the input buffer will fill depends on the frame size of the Ethernet MAC frames. Note that the buffer fills at a faster rate as the frame size increases. What this means is that for a fixed buffer size, which is the case in a typical implementation, the buffer fills more slowly for 64 byte frames than for 9600 byte frames. Note, in the descriptions herein, 9600 bytes are chosen from a maximum frame size, but the systems and methods herein can also apply to larger frame sizes. Thus, if PAUSE frames are periodically sent to alleviate the buffer fill problem, the PAUSE duration (the delay introduced to slow down the effective input rate) can be smaller for smaller packets.

Table 5 below shows a calculation of the required pause duration in units of 512 bit times for the 64 byte packet case (the minimum packet size) which is the green quanta, $Q(g)$, and for the 9600 byte packet case (the maximum packet size) which is the red quanta, $Q(r)$, given the PAUSE frame periodicity of 10 μs. The values for $Q(g)$ and $Q(r)$ are derived based on the values in Table 4. Of note, the values of $Q(g)$ are derived using the 64 byte values in Table 4, and the values of $Q(r)$ are derived using the 9600 byte values in Table 4. For Table 5, the PAUSE tick is 10 μs, a single pause quanta is 512 bit times and an allowed range is 0 to 65535 quanta.

TABLE 5

Quanta, Q(g) and Q(r), calculation

| ODUk.ts, ts = | Green pause freq | quant Q(g) | hex | Red pause freq | Quant Q(r) | hex | Time between Pause |
|---|---|---|---|---|---|---|---|
| 1 | 100000 | 167 | 00A7 | 100000 | 171 | 00AB | 1E−05 |
| 2 | 100000 | 139 | 008B | 100000 | 147 | 0093 | 1E−05 |
| 3 | 100000 | 110 | 006E | 100000 | 123 | 007B | 1E−05 |
| 4 | 100000 | 82 | 0052 | 100000 | 98 | 0062 | 1E−05 |
| 5 | 100000 | 54 | 0036 | 100000 | 74 | 004A | 1E−05 |
| 6 | 100000 | 25 | 0019 | 100000 | 49 | 0031 | 1E−05 |
| 7 | 100000 | 0 | 0000 | 100000 | 25 | 0019 | 1E−05 |
| 8 | 100000 | 0 | 0000 | 100000 | 0 | 0000 | 1E−05 |

From the above, there is quanta based on 64 byte MAC frames, $Q(g)$, and quanta based on 9600 byte MAC frames, $Q(r)$. When each is used depends on the round trip delay between the 10 GbE client device and the transport system, i.e. between the network elements 12, 14. Assume operation using the 64 byte duration for the quanta and suddenly enough 9600 byte packet arrive such that the input buffer were to overflow before issuing PAUSE frames with 9600 byte durations. This happens because at the moment the PAUSE duration is set, there can be larger packets already in transit from the 10 GbE client to the transport system and they will be sent until the issued PAUSE frame travels from the transport system to the 10 GbE client. Therefore large packets can be sent for a period of time equal to the round trip delay between the 10 GbE client device and the transport system before pause duration changes take effect. The amount of data that can accumulate is equal to the round trip delay times the difference between the 9600 byte and 64 byte buffer fill rates. This dictates the minimum amount of memory required to avoid data loss (buffer overflow). Buffer underflow is not a problem since no data is lost, but the system will not be as efficient as possible. So it is also desirable to have enough buffer memory to make sure the buffer never underflows and is therefore operating as efficiently as possible. This requires at least twice the memory required to avoid overflow. By monitoring the buffer fill (in this case it would be right in the middle of the buffer), the pause duration can be determined. That is, below the threshold, use the minimum (64 byte) duration, $Q(g)$, (i.e., there is enough headroom to absorb the round trip problem) and above the threshold, use the maximum (9600 byte) duration, $Q(r)$, (i.e., there is enough buffer currently filled to avoid buffer underflow should small packets be sent to the round trip time).

The question is how to determine the round trip latency and thus determine the amount of buffer required and the threshold for making the $Q(g)/Q(r)$ decision. Specifically, this is determinative of the watermark 52. This could be done by actually measuring the value and provisioning it at installation time, but if the configuration is changed, the measurement is inaccurate, or the data is entered incorrectly this could result in packet loss. However, the link between the client 10 GbE device and the transport system is driven through a pluggable optical device. Each device is rated for a particular length of optical fiber and devices designed for shorter lengths generally will not operate properly for longer fibers. In addition, since devices with short range capability are generally cheaper than longer reach devices, longer reach devices are only used when necessary. By knowing the type of optical device being used on the interface, the worst case fiber length and therefore the round trip delay, can be determined which defines the required buffering/thresholding parameters, i.e. the watermark 52. This makes the operation adaptable to the application.

In view of the foregoing, the following Tables 6-12 illustrate exemplary computed Q(g) and Q(r) values.

TABLE 6

Q(g) and Q(r) values for GbE over VC3-Xv, X = 1, 5, 10, 15, and 20
GbE over VC3-Xv

| X | Qg (x512b) | Qr (x512b) | T (μs) |
|---|---|---|---|
| 1 | 185 | 186 | 100 |
| 5 | 141 | 149 | 100 |
| 10 | 86 | 101 | 100 |
| 15 | 30 | 54 | 100 |
| 20 | 0 | 7 | 100 |

TABLE 7

Q(g) and Q(r) values for GbE over VC4-Xv, X = 1, 3, and 6
GbE over VC4-Xv

| X | Qg (x512b) | Qr (x512b) | T (μs) |
|---|---|---|---|
| 1 | 162 | 167 | 100 |
| 3 | 93 | 108 | 100 |
| 6 | 0 | 20 | 100 |

TABLE 8

Q(g) and Q(r) values for 10GbE over
VC3-Xv, X = 1, 48, 96, 144, and 192
10GbE over VC3-Xv

| X | Qg (x512b) | Qr (x512b) | T (μs) |
|---|---|---|---|
| 1 | 195 | 195 | 10 |
| 48 | 143 | 150 | 10 |
| 96 | 90 | 105 | 10 |
| 144 | 37 | 60 | 10 |
| 192 | 0 | 14 | 10 |

TABLE 9

Q(g) and Q(r) values for 10GbE over VC4-Xv, X = 1, 32, and 64
10GbE over VC4-Xv

| X | Qg (x512b) | Qr (x512b) | T (μs) |
|---|---|---|---|
| 1 | 192 | 193 | 10 |
| 32 | 87 | 102 | 10 |
| 64 | 0 | 8 | 10 |

TABLE 10

Q(g) and Q(r) values for 10GbE over STM-64c
10GbE over STM-64c

| | Qg (x512b) | Qr (x512b) | T (μs) |
|---|---|---|---|
| 64c | 0 | 8 | 10 |

TABLE 11

Q(g) and Q(r) values for 40GbE over ODUk.ts, ts = 1, 16, 24, and 32
40GbE over ODUflex

| ODUk.ts, ts= | Qg (x512b) | Qr (x512b) | T (μs) |
|---|---|---|---|
| 1 | 753 | 757 | 10 |
| 16 | 325 | 389 | 10 |
| 24 | 96 | 193 | 10 |
| 32 | 0 | 0 | 10 |

TABLE 12

Q(g) and Q(r) values for 100GbE over
ODUk.ts, ts = 1, 20, 40, 60, 76, and 80
100GbE over ODUflex

| ODUk.ts, ts= | Qg (x512b) | Qr (x512b) | T (μs) |
|---|---|---|---|
| 1 | 1925 | 1929 | 10 |
| 20 | 1382 | 1463 | 10 |
| 40 | 768 | 936 | 10 |
| 60 | 175 | 427 | 10 |
| 76 | 0 | 20 | 10 |
| 80 | 0 | 0 | 10 |

Figure 4:
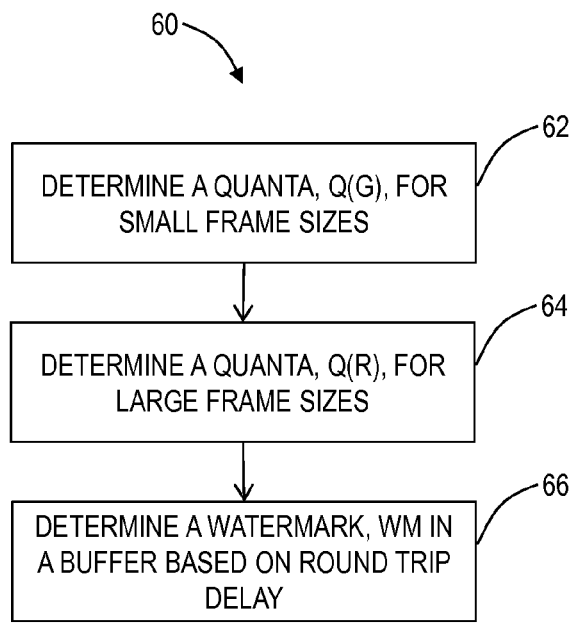
FIG. 4 is a flowchart of an Ethernet flow control method for determining quanta values and a watermark for a buffer.

Referring to FIG. 4, in an exemplary embodiment, a flowchart illustrates a Ethernet flow control method 60 for determining quanta values and the watermark 52 for the buffer 50. In an exemplary embodiment, Ethernet flow control can be managed using quanta values in PAUSE frames optimized for small frames and large frames. That is, the Ethernet flow control systems and methods can use quanta in PAUSE frames optimized for small frames if buffer fill is less than (or equal to) the watermark 52 and quanta in PAUSE frames optimized for large frames if buffer fill is greater than (or equal to) the watermark 52. The method 60 includes determining a quanta, Q(g), for small frame sizes, e.g. 64 byte frames (step 62). The method 60 includes determining a quanta, Q(r), for large frame sizes, e.g. 9600 byte frames (step 64). The method 60 finally includes determining a watermark, WM, in a buffer based on round trip delay (step 66). The determination of Q(g) and Q(r) can be based on the aforementioned Tables. Specifically, the determination of the quanta values, Q(g) and Q(r), can be based on computations involving Ethernet rate and container rate. The container rate can consider worse case clock conditions, i.e. lowest possible container rate. Additionally, the computations of the Ethernet rate and container rate can include the packing efficiency associated with GFP-F mapping. The computations can determine a buffer fill rate without PAUSE frames based on differences of rates between the Ethernet rate and the container rate. The buffer fill rate can be used to determine optimal values for the quanta values, Q(g) and Q(r). These optimal values are calculated based on a pause tick frequency, frame size, the buffer fill rate, and a single pause quanta value. For example, the pause tick frequency can be 10 μs, 100 μs, etc. and the frame size can be 64 bytes and 9600 bytes. The buffer fill rate can be a difference between the Ethernet rate and the container rate, and the single pause quanta value can be 512 bit times.

The watermark is determined as described herein based on worst case fill rates of the buffer taking into account round trip times. For example, the worst case fill rate can be computed based on differences of the buffer fill rates between the large frames and the small frames. The worst case fill rate can be the largest of these differences for different container values. From the worst case fill rate, a round trip fill rate can be computed based on distance, round trip delay, and large frame size (e.g., 9600 bytes). As described herein, the method 60 can determine distance and round trip delay based on a type of module being used for the connection, i.e. worst case ratings for the particular module. With this worst case round trip fill rate, the watermark can be determined based on how large the buffer is and how much headroom is available in the buffer considering the worst case round trip fill rate.

Figure 5:
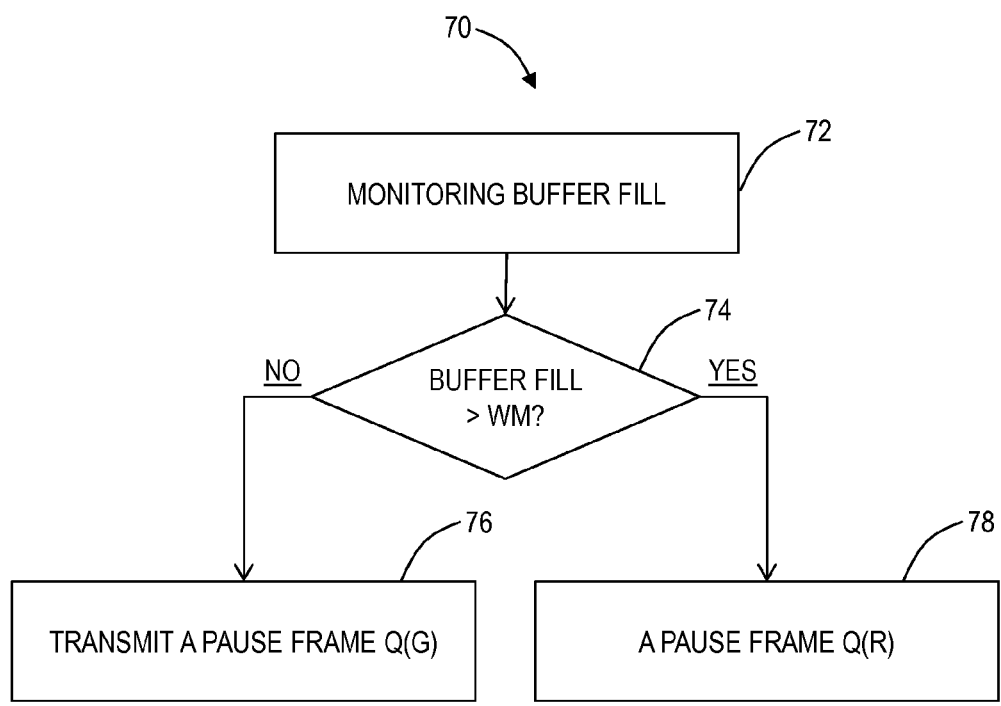
FIG. 5 is a flowchart of an Ethernet flow control method for monitoring and managing a buffer using the watermark and determined quanta values from the method of FIG. 4.

Referring to FIG. 5, in an exemplary embodiment, a flowchart illustrates an Ethernet flow control method 70 for monitoring the buffer 50 using the watermark 52 and the determined quanta values from the method 60. Here, the quanta values, Q(g) and Q(r), are predetermined. The watermark can be determined based on buffer size and module type (i.e., to determine distance and round trip delay) in a network element implementing the method 70. The method 70 includes monitoring buffer fill (step 72). The method 70 checks if the monitored buffer fill against the watermark, WM (step 74). If the monitored buffer fill is less than (or equal to) the watermark, a PAUSE frame is transmitted with the quanta, Q(g) (step 76). If the monitored buffer fill is greater than (or equal to) the watermark, a PAUSE frame is transmitted with the quanta, Q(r) (step 78).

Figure 6:
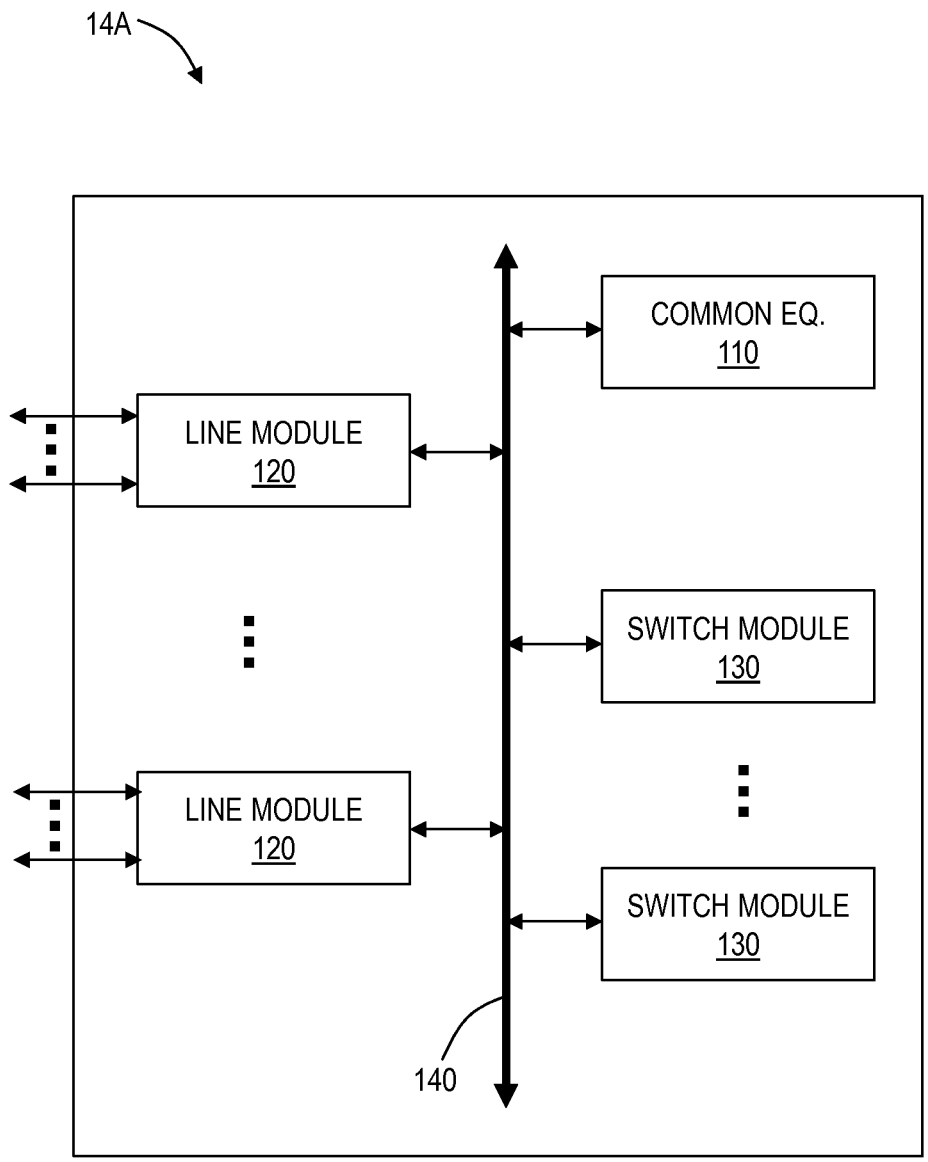
FIG. 6 is a block diagram of an exemplary network element for the Ethernet flow control systems and methods.

Referring to FIG. 6, in an exemplary embodiment, a block diagram illustrates an exemplary network element 14A for the Ethernet flow control systems and methods. In an exemplary embodiment, the network element 14A can be a nodal device that can consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 14A can be an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 14A can be any digital system with ingress and egress digital signals namely Ethernet frames from an ingress to an egress while adapting the rate of the Ethernet frames therebetween.

In an exemplary embodiment, the network element 14A includes common equipment 110, one or more line modules 120, and one or more switch modules 130. The common equipment 110 can include power; a control module; operations, administration, maintenance, and provisioning (OAM&P) access; and the like. The common equipment 110 can connect to a management system (e.g., a network management system (NMS), element management system (EMS), or the like) through a data communication network 160. Additionally, the common equipment 110 can include a control plane processor configured to operate a control plane (e.g., Automatically Switched Optical Network (ASON), Generalized Multi-Protocol Label Switching (GMPLS), etc.). The network element 14A can include an interface 140 for communicatively coupling the common equipment 110, the line modules 120, and the switch modules 130 therebetween. For example, the interface 140 can be a backplane, mid-plane, a bus, optical or electrical connectors, or the like.

The line modules 120 are configured to provide ingress and egress to the switch modules 130 and external to the network element 100. In an exemplary embodiment, the line modules 120 can form ingress and egress switches with the switch modules 130 as center stage switches for a three-stage switch, e.g. a three stage Clos switch. The line modules 120 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 120 can include a plurality of optical connections per module and each module can include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 120 can include wavelength division multiplexing interfaces, short reach interfaces, and the like, and can connect to other line modules 120 on remote network elements, end clients, edge routers, and the like. From a logical perspective, the line modules 120 provide ingress and egress ports to the network element 100, and each line module 120 can include one or more physical ports. In context of the Ethernet flow control systems and methods, the line modules 120 can include the buffers 50 and circuitry, logic, firmware, software, etc. to implement the methods described herein. For example, the line modules 120 can be configured to transmit PAUSE frames with quanta values based on the methods described herein.

The switch modules 130 are configured to switch channels, timeslots, tributary units, etc. between the line modules 120. For example, the switch modules 130 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 130 can include both Time Division Multiplexed (TDM) (i.e., circuit switching) and packet switching engines. The switch modules 130 can include redundancy as well, such as 1:1, 1:N, etc. In context of the Ethernet flow control systems and methods, the switch modules 120 can include the buffers 50 and circuitry, logic, firmware, software, etc. to implement the methods described herein.

Those of ordinary skill in the art will recognize the network element 14A can include other components which are omitted for illustration purposes, and that the systems and methods described herein are contemplated for use with a plurality of different network elements with the network element 14A presented as an exemplary type of network element. For example, in another exemplary embodiment, the network element 14A may not include the switch modules 130, but rather have the corresponding functionality in the line modules 120 (or some equivalent) in a distributed fashion. For the network element 14A, other architectures providing ingress, egress, and switching therebetween are also contemplated for the systems and methods described herein. In general, the systems and methods described herein contemplate use with any network element providing ingress and egress of Ethernet connections.

Also, the network element 14A may not include switching functionality, i.e. the network element 14A without the switch modules 130. In this exemplary embodiment, the network element 14A can solely provide transport, such as a WDM or Dense WDM terminal, a reconfigurable optical add/drop multiplexer (ROADM), etc. Here, the network element 14A is configured to interface on an ingress side with an Ethernet connection and provide the Ethernet connection to an egress side, such as with GFP-F mapping and placement in a container. In this exemplary embodiment, the line modules 120 can include the buffers 50 and circuitry, logic, firmware, software, etc. to implement the methods described herein. For example, the line modules 120 can be configured to transmit PAUSE frames with quanta values based on the methods described herein.

Figure 7:
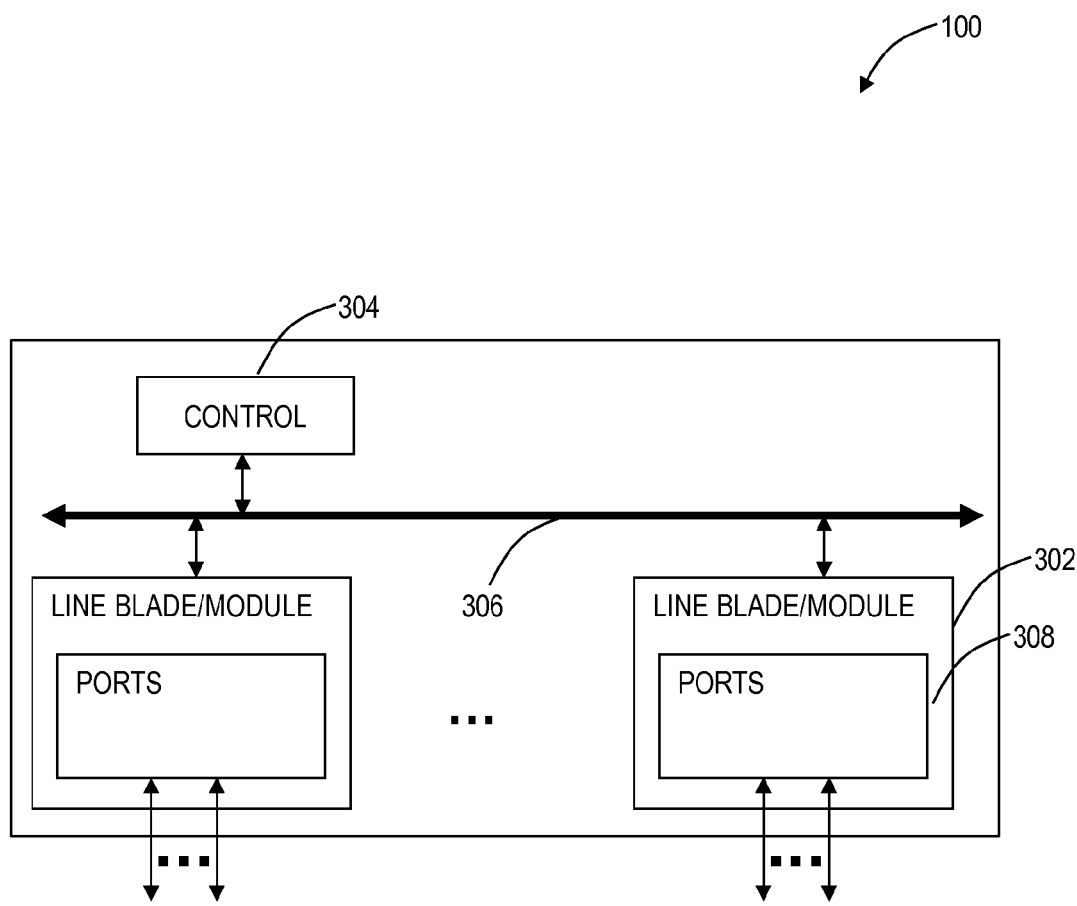
FIG. 7 is a block diagram of another exemplary network element for the Ethernet flow control systems and methods.

Referring to FIG. 7, in an exemplary embodiment, a block diagram illustrates an exemplary implementation of the network element 100. In an exemplary embodiment, the network element 100 can be the network element 12. For example, the network element 12 can be an Ethernet network switch, a client, a server, a storage device, or any device with an Ethernet connection therefrom. In another exemplary embodiment, the network element 100 can be the network element 14 as well. In the exemplary embodiment of FIG. 7, the network element 100 includes a plurality of blades 302, 304 interconnected via an interface 306. The blades 302, 304 are also known as line cards, line modules, circuit packs, pluggable modules, etc. and refer generally to components mounted within a chassis, shelf, etc. of the network element 100. Alternatively, the functionality of each of the blades 302, 304 cab be integrated within a single module, such as in the layer two switch integrated within an optical network element. Each of the blades 302, 304 can include numerous electronic devices and optical devices mounted on a circuit board along with various interconnects including interfaces to the chassis, shelf, etc. Two exemplary blades in the network element 100 include line blades 302 and control blades 304.

The line blades 302 generally include data ports 308 such as a plurality of Ethernet ports. For example, the line blades 302 can include a plurality of physical ports disposed on an exterior of the blades 302 for receiving ingress/egress connections. In context of the Ethernet flow control systems and methods, the line blades 302 can include the buffers 50 and circuitry, logic, firmware, software, etc. to implement the methods described herein. For example, the line blades 302 can be configured to transmit PAUSE frames with quanta values based on the methods described herein. Also, the line blades 302 can include circuitry, logic, firmware, software, etc. to receive PAUSE frames with quanta values based on the methods described herein, and to implement pause functionality equal to the quanta values. Additionally, the line blades 302 can include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 100 out by the correct port 308 to the next network element. "Switching fabric" includes switching units, or individual boxes, in a node; integrated circuits contained in the switching units; and programming that allows switching paths to be controlled. The control blades 304 can include a microprocessor, memory, software, and a network interface to operate the network element 100.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A network element implemented method, comprising:
receiving an Ethernet connection at a first rate;
transmitting the Ethernet connection at a second rate in a container;
monitoring a buffer fill associated with the Ethernet connection; and
periodically transmitting pause frames to a device associated with the Ethernet connection, wherein the pause frames comprise a determined optimal pause quanta value based on the first rate, the second rate, Ethernet frame size, and the buffer fill;
wherein the first rate is associated with a rate of the Ethernet connection, and wherein the second rate is associated with a rate of the container,
wherein the periodically transmitting pause frames comprises, if buffer fill is in a first region, periodically transmitting pause frames with the determined optimal pause quanta value comprising a first value, Q(g), and, if buffer fill is in a second region, periodically transmitting ause frames with the determined optimal pause quanta value comprising a second value, r and wherein the first value, Q(g), is determined based on a small frame size for the Ethernet connection and the second value, Q(r), is determined based on a large frame size for the Ethernet connection.

2. The method of claim 1, further comprising:
prior to transmitting the Ethernet connection at the second rate, mapping the Ethernet connection using Generic Framing Protocol.

3. The method of claim 2, further comprising:
mapping the Generic Framing Protocol mapped Ethernet connection into a container.

4. The method of claim 1, further comprising:
prior to the monitoring, determining the determined optimal pause quanta value based on the first rate, the second rate, and the buffer fill;
monitoring the buffer fill to determine the buffer fill relative to a watermark; and
periodically transmitting pause frames with the determined optimal pause quanta value based on the buffer fill relative to the watermark.

5. The method of claim 4, further comprising:
determining the determined optimal pause quanta value while accounting for a packing efficiency based on Generic Framing Protocol mapping.

6. The method of claim 4, further comprising:
determining the watermark based on a round trip delay on the receiving.

7. The method of claim 6, wherein the round trip delay is determined by a physical module performing the receiving.

8. The method of claim 1, wherein the small frame size comprises 64 bytes and the large frame size comprises 9600 bytes.

9. A network element, comprising:
a first port configured to receive an Ethernet connection at a first rate;
a second port configured to transmit the Ethernet connection at a second rate in a container; and monitor circuitry configured to:
    monitor a buffer fill associated with the Ethernet connection; and
    cause the first port to periodically transmit pause frames, wherein the pause frames comprise a determined optimal pause quanta value based on the first rate, the second rate, Ethernet frame size, and the buffer fill, wherein the monitor circuitry is further configured to, if buffer fill is in a first region, cause the first port to periodically transmit pause frames with the determined optimal pause quanta value comprising a first value, Q(g), and, if buffer fill is in a second region, cause the first port to periodically transmit pause frames with the determined optimal pause quanta value comprising a second value, Q(r),
wherein the first value, Q(g), is determined based on a small frame size for the Ethernet connection and the second value, Q(r), is determined based on a large frame size for the Ethernet connection, and
wherein the first rate is associated with a rate of the Ethernet connection, and wherein the second rate is associated with a rate of the container.

10. The network element of claim 9, further comprising:
    mapping circuitry configured to map the Ethernet connection using Generic Framing Protocol into a container.

11. The network element of claim 9, wherein the determined optimal pause quanta value is determined based on the first rate, the second rate, and the buffer fill; and the monitor circuitry is configured to:
    monitor the buffer fill to determine the buffer fill relative to a watermark; and
    cause the first port to periodically transmit pause frames with the determined optimal pause quanta value based on the buffer fill relative to the watermark.

12. The network element of claim 11, wherein the determined optimal pause quanta value is determined while accounting for a packing efficiency based on Generic Framing Protocol mapping.

13. The network element of claim 11, wherein the watermark is determined based on a round trip delay between the first port and the second port.

14. A network, comprising:
    a first network element;
    a second network element;
    an Ethernet connection between the first network element and the second network element, wherein the Ethernet connection operates at a first rate;
    a container between the first network element and the second network element, wherein the container contains the Ethernet connection, and wherein the container operates at a second rate; and
    a flow control system between the first network element and the second network element, wherein the flow control system causes pause frames to be periodically transmitted from the first network element to the second network element with a determined optimal pause quanta, and wherein the determined optimal pause quanta is based on the first rate of the Ethernet connection, the second rate of the container, Ethernet frame size, packing efficiency of the container, round trip delay between the first network element and the second network element, and monitored buffer fill at the first network element,
wherein the flow control system configured to, if buffer fill is in a first region, cause the first network element to periodically transmit pause frames with the determined optimal pause quanta value comprising a first value, Q(g), and, if buffer fill is in a second region, cause the first network element to periodically transmit pause frames with the determined optimal pause quanta value comprising a second value, Q(r),
wherein the first value, Q(g), is determined based on a small frame size for the Ethernet connection and the second value, Q(r), is determined based on a large frame size for the Ethernet connection.

* * * * *